United States Patent
Ruppel et al.

(10) Patent No.: US 11,729,593 B2
(45) Date of Patent: *Aug. 15, 2023

(54) SYSTEM AND METHOD OF REDUCING A COMMUNICATION RANGE

(71) Applicant: Aptiv Technologies Limited, St. Michael (BB)

(72) Inventors: Christopher D. Ruppel, Carmel, IN (US); Sunil Lingamurthy Javali, Kokomo, IN (US)

(73) Assignee: Aptiv Technologies Limited, St. Michael (BB)

( * ) Notice: Subject to any disclaimer, the term of this patent is extended or adjusted under 35 U.S.C. 154(b) by 98 days.

This patent is subject to a terminal disclaimer.

(21) Appl. No.: 17/482,783

(22) Filed: Sep. 23, 2021

(65) Prior Publication Data

US 2022/0014893 A1 Jan. 13, 2022

Related U.S. Application Data

(63) Continuation of application No. 16/370,064, filed on Mar. 29, 2019, now Pat. No. 11,146,934.

(51) Int. Cl.
*H04W 4/80* (2018.01)
*H04W 88/02* (2009.01)

(52) U.S. Cl.
CPC .............. *H04W 4/80* (2018.02); *H04W 88/02* (2013.01)

(58) Field of Classification Search
CPC .................................. H04W 4/80; H04W 88/02
See application file for complete search history.

(56) References Cited

U.S. PATENT DOCUMENTS 5,268,795 A 12/1993 Usami
7,231,177 B2 6/2007 Walker et al.
(Continued)

FOREIGN PATENT DOCUMENTS

CN 103684533 3/2014
DE 102012008914 11/2013
(Continued)

OTHER PUBLICATIONS

"Foreign Office Action", EP Application No. 20157054.6, dated Apr. 29, 2022, 4 pages.
(Continued)

*Primary Examiner* — Lewis G West
(74) *Attorney, Agent, or Firm* — Sawtooth Patent Group PLLC

(57) ABSTRACT

A system includes a first transceiver and a controller circuit. The first transceiver is configured to transmit first radio frequency (RF) signals. The first transceiver is further configured to output the first RF signals at a first transmission level corresponding to a first transmission range. The controller circuit is communicatively coupled with the first transceiver. The controller circuit is configured to attenuate the first RF signals to transfer the first RF signals at a second transmission level lower than the first transmission level. The second transmission level corresponds to a shorter transmission range than the first transmission range. The controller circuit detects a presence of at least one second transceiver within the shorter transmission range using the first RF signals transmitted at the second transmission level.

20 Claims, 4 Drawing Sheets

(56) References Cited

U.S. PATENT DOCUMENTS

| | | | |
|---|---|---|---|
| 7,772,966 B2 | 8/2010 | Turnbull et al. | |
| 8,576,138 B2 | 11/2013 | Suzuki et al. | |
| 8,614,645 B2 | 12/2013 | Chakam et al. | |
| 9,201,627 B2* | 12/2015 | Tam | G06F 3/1454 |
| 9,875,591 B2* | 1/2018 | Watters | H04W 4/80 |
| 10,085,072 B2 | 9/2018 | Shimy et al. | |
| 10,149,133 B2* | 12/2018 | Scagnol | G01S 5/02213 |
| 10,564,261 B2 | 2/2020 | Huebner et al. | |
| 10,793,109 B2* | 10/2020 | Salah | B60R 25/245 |
| 10,839,627 B2* | 11/2020 | Golsch | G01S 5/011 |
| 11,146,934 B2 | 10/2021 | Ruppel et al. | |
| 2002/0003481 A1* | 1/2002 | Kantola | H04W 52/50 |
| | | | 340/13.37 |
| 2003/0142004 A1 | 7/2003 | Gottwald et al. | |
| 2005/0258936 A1 | 11/2005 | Ghabra et al. | |
| 2006/0022881 A1 | 2/2006 | Vegin et al. | |
| 2006/0097906 A1 | 5/2006 | Heide | |
| 2010/0317289 A1* | 12/2010 | Desai | H04B 17/318 |
| | | | 455/41.2 |
| 2011/0156946 A1 | 6/2011 | Margomenos | |
| 2014/0240091 A1* | 8/2014 | Talty | B60R 25/245 |
| | | | 340/5.62 |
| 2014/0330449 A1 | 11/2014 | Oman et al. | |
| 2014/0357194 A1* | 12/2014 | Jin | H04B 17/318 |
| | | | 455/41.2 |
| 2015/0048927 A1* | 2/2015 | Simmons | G07C 9/00309 |
| | | | 340/5.61 |
| 2015/0134949 A1* | 5/2015 | Baldwin | H04W 4/023 |
| | | | 713/153 |
| 2016/0050219 A1* | 2/2016 | Niewczas | H04W 12/10 |
| | | | 726/5 |
| 2016/0050564 A1* | 2/2016 | Niewczas | H04W 12/06 |
| | | | 455/411 |
| 2017/0093727 A1* | 3/2017 | Chen | H04W 76/10 |
| 2017/0111763 A1* | 4/2017 | Morgan | H04B 7/0697 |
| 2019/0069243 A1* | 2/2019 | Bean | G06F 1/3209 |
| 2019/0297628 A1* | 9/2019 | Kato | H04W 72/0453 |
| 2020/0314619 A1 | 10/2020 | Ruppel et al. | |
| 2021/0284098 A1 | 9/2021 | Scott et al. | |

FOREIGN PATENT DOCUMENTS

| | | |
|---|---|---|
| DE | 102014220713 | 4/2016 |
| WO | 2018183036 | 10/2018 |

OTHER PUBLICATIONS

"Extended European Search Report", EP Application No. 21161609.9, dated Jul. 16, 2021, 11 pages.

"Extended European Search Report", EP Application No. 20157054.6, dated Aug. 28, 2020, 8 pages.

"Non-Final Office Action", U.S. Appl. No. 16/370,064, dated Dec. 30, 2020, 6 pages.

"Notice of Allowance", U.S. Appl. No. 16/370,064, dated Jun. 9, 2021, 8 pages.

"Foreign Office Action", CN Application No. 202010229904.7, dated Nov. 25, 2021, 16 pages.

* cited by examiner

| ATTENUATION LEVEL (dBm) | MAXIMUM IDEAL RANGE (METERS) | MAXIMUM RANGE WITH INTERFERENCE (METERS) |
|---|---|---|
| 0 | 600 | 18 |
| 10 | 200 | 8.4 |
| 30 | 65 | 3.9 |
| 30 | 20 | 1.8 |
| 40 | 6.5 | 0.84 |
| 50 | 2 | 0.39 |

FIG. 2

SYSTEM AND METHOD OF REDUCING A COMMUNICATION RANGE

CROSS-REFERENCE TO RELATED APPLICATION

This application is a continuation of and claims priority to U.S. patent application Ser. No. 16/370,064, filed Mar. 29, 2019, the disclosure of which is incorporated by reference herein in its entirety.

TECHNICAL FIELD OF INVENTION

This disclosure generally relates to a system that reduces a communication range between wireless communication devices.

BRIEF DESCRIPTION OF DRAWINGS

The present invention will now be described, by way of example with reference to the accompanying drawings, in which:

FIG. 2 is a table illustrating estimated communication ranges in accordance with one embodiment;

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
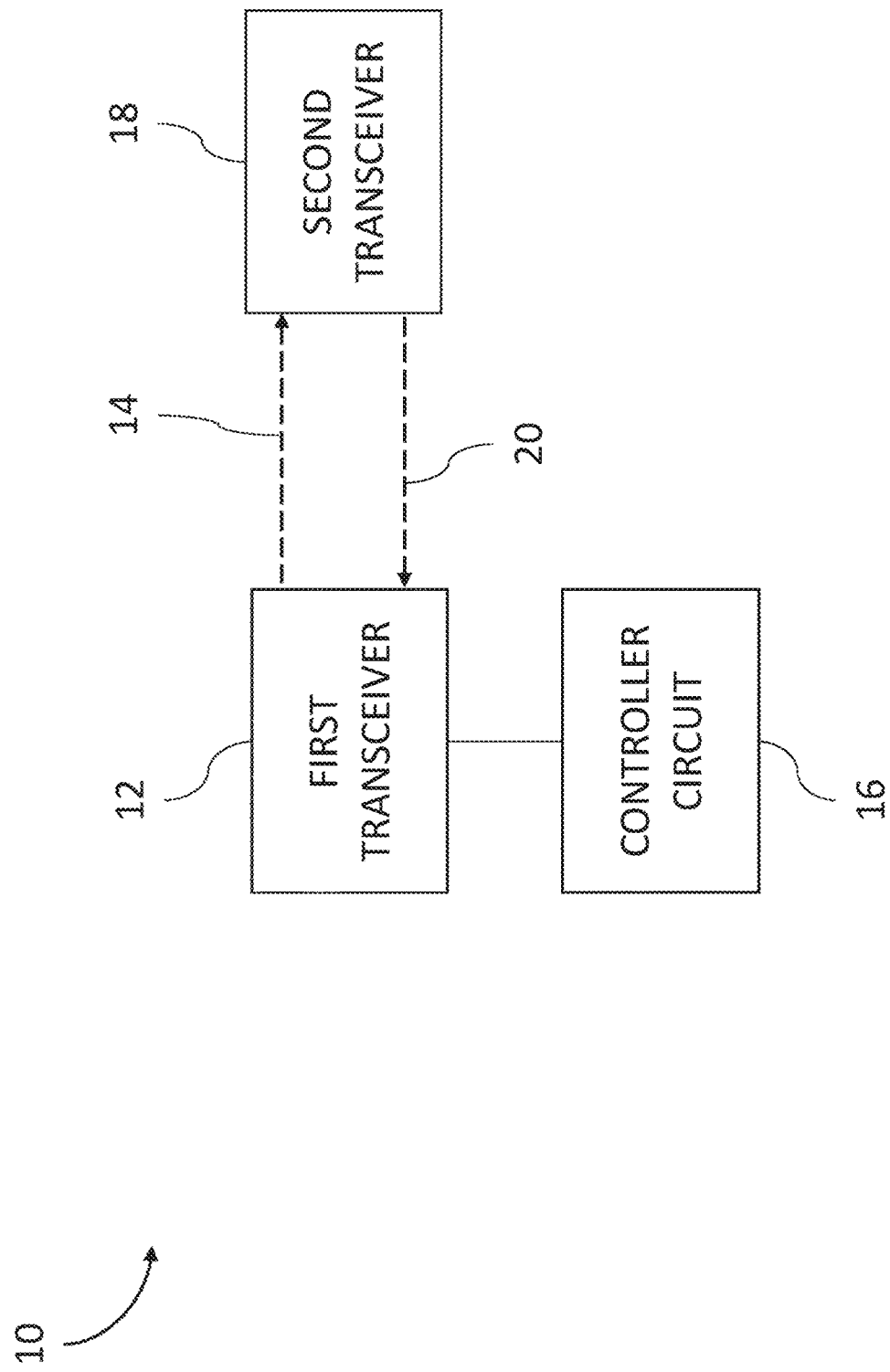
FIG. 1 is an illustration of a system that reduces a communication range in accordance with one embodiment.

FIG. 1 illustrates an example of a system 10 that reduces a communication range between wireless communication devices. As will be described in more detail below, the system 10 may provide various improvements over other systems.

The system 10 includes a first transceiver 12 configured to transmit first radio frequency (RF) signals 14. In the example illustrated in FIG. 1, the first RF signals 14 are high frequency RF signals that comply with a BLUETOOTH® Core Specification version 4.2 and later, including BLUETOOTH® Low Energy (hereafter BLE). In an example, the first transceiver 12 is a BLUETOOTH® device that is installed in a vehicle as part of a telematic control unit (TCU). In an example, the TCU controls tracking of the vehicle's position and includes, a global positioning system unit (GPS), an external mobile communication interface to communicate the position to a database server, an electronic processing unit, a microcontroller and/or a microprocessor, a memory or electronic storage media, and interface communications buses to other vehicle systems.

The first transceiver 12 is configured to both transmit and receive BLE RF signals. The first transceiver 12 includes an antenna (not shown) configured to emit and collect the BLE RF signals. In an example the antenna is a micro-strip antenna. In another example, the antenna is a metal plate antenna. In yet another example, the antenna is a chip antenna. The BLE RF signals are transmitted in a 2.4 GHz frequency band (i.e., 2.400-2.4835 GHz) and have a maximum theoretical unobstructed range exceeding 600 meters (600 m). BLE is commonly employed in mobile phones, gaming systems, headsets, automotive infotainment systems, and personal computers. BLE devices are detected through a procedure based on broadcasting advertising packets from a host device (e.g. the vehicle), and receiving scan request packets from a remote device (e.g., a smartphone). This is done using three separate frequencies within the frequency band, in order to reduce interference. The BLE advertising device sends a packet of information on at least one of the three frequencies, with a repetition period called the advertising interval. A BLE scanner in the host device listens to the frequency for a duration called the scan window, when the scan request packets are received, which is periodically repeated every scan interval. BLE devices may be paired by sharing a code unique to each BLE device, called a link key. The link keys are exchanged between the pairing devices and stored in the pairing devices to establish a secure connection, also referred to as a bond. The unconnected and/or unpaired devices may share a limited amount of information without pairing, such as a device name, a device class, a list of services provided by the device and other technical information specific to the device (e.g., device services, manufacturer, BLE specification, and clock offset). The first transceiver 12 is further configured to output the first RF signals 14 at a first transmission level corresponding to a first transmission range. In an example, the first transmission level is a full power level of the first transceiver 12 (e.g., 0.5 mW to 10 mW) that corresponds to a maximum range of transmission (e.g., greater than 600 m).

The system 10 also includes a controller circuit 16 communicatively coupled with the first transceiver 12. The controller circuit 16 may include a processor (not shown) such as a microprocessor or other control circuitry such as analog and/or digital control circuitry. The control circuitry may include one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. The controller circuit 16 may also combine custom hard-wired logic, ASICs, or FPGAs with custom programming to accomplish the techniques. The controller circuit 16 may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying special programming signals. The controller circuit 16 may include other examples of non-volatile memory, such as flash memory, read-only memory (ROM), programmable read-only memory (PROM), and erasable programmable read-only memory (EPROM). The controller circuit 16 may include volatile memory, such as dynamic random-access memory (DRAM), static random-access memory (SRAM). The one or more routines may be executed by the processor to perform steps for detecting a presence of at least one second transceiver 18 based on signals received by the controller circuit 16 from the first transceiver 12 as described herein. In an example, the first transceiver 12 includes the controller circuit 16 (i.e., the controller circuit 16 is integral to the first transceiver 12 electrical packaging). In another example, the first transceiver 12 and the controller circuit 16 are separate devices.

The controller circuit 16 is configured to attenuate (i.e., weaken, diminish, reduce, etc.) the first RF signals 14 to transfer the first RF signals 14 at a second transmission level that is lower than the first transmission level. Signal attenuation reduces a strength or power of the RF signal without appreciably distorting the RF signal's waveform. That is, the power is reduced without significantly affecting the wavelength and/or modulation characteristics of the RF signal. Distorting the waveform would negatively affect the efficiency of the first transceiver 12. Signal attenuation typically is expressed in units of decibels (dB), where a 10 dB reduction represents a 10 fold reduction in the signal power. The decibel is a logarithmic-based value that is used to express the ratio of one value of a power to another power value (i.e. a power ratio) on a logarithmic scale. In an example, a 1 dB reduction in the signal power corresponds to an approximate 21% reduction in power, and a 3 dB reduction in the signal power corresponds to an approximate 50% reduction in power. The second transmission level corresponds to a shorter transmission range than the first transmission range due to the reduced signal power. Typically, the power of an RF signal is expressed in units of dBm, which indicates the power ratio is referenced to one milliwatt (1 mW). As such, a power level of 0.0 dBm corresponds to a power of 1 mW. In an example, the controller circuit 16 attenuates the first RF signals 14 up to about 50 dBm out of a total BLE RF link budget of 90 dBm to 105 dBm. The link budget is a difference between the maximum RF signal power (about +5 dBm to +10 dBm) and the best reception sensitivity (about −90 dBm to −95 dBm). In this example, attenuating first RF signals 14 by 50 dBm eliminates almost half of the original dBm link budget. As a result, the 50 dBm power reduction is approximately equivalent to reducing a radius of coverage to about 0.316% of the original radius of coverage. In this example, the controller circuit 16 reduces the communication range between the system 10 and the second transceiver 18 to a range of about 0.4 m to about 2 m, from the initial range of 600 m. FIG. 2 is a table that indicates estimates of the reduction in the communication distance at various levels of attenuation, for both ideal (i.e., no signal interference), and typical environmental conditions that include common levels of RF signal interference and RF signal noise.

Figure 3:
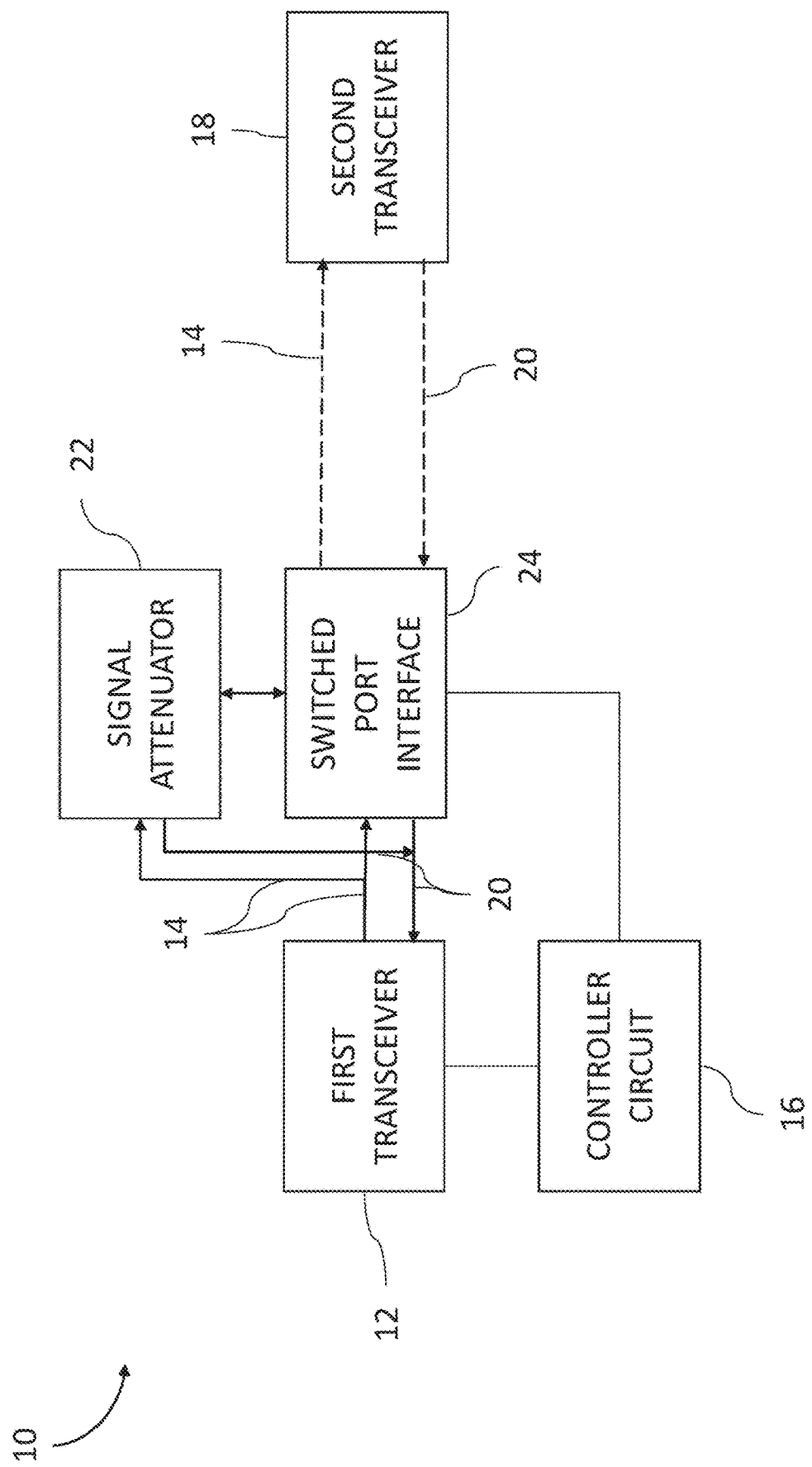
FIG. 3 is an illustration of another system that reduces a communication range in accordance with one embodiment.

In the example illustrated in FIG. 3, the controller circuit 16 attenuates the first RF signals 14 through a separate signal attenuator 22 device that is communicatively coupled to a switched port interface 24. The switched port interface 24 has at least one RF antenna (not shown) communicatively coupled to at least two switched ports. The controller circuit 16 routes the first RF signals 14 from the first transceiver 12 to a first switched port, whereby the first RF signals 14 pass through the signal attenuator 22 interposed between the first switched port and the first transceiver 12, thereby reducing a range of communication of the first RF signals 14. The signal attenuator 22 may be any signal attenuator 22 compatible with the BLE specification. In an example, the signal attenuator 22 attenuates the first RF signals 14 at a fixed rate (e.g., 50 dBm). In another example, the signal attenuator 22 attenuates the first RF signals 14 at a variable rate (e.g., 10 dBm-50 dBm).

In another example, the controller circuit 16 attenuates the first RF signals 14 by reducing a transmission power of the first transceiver 12 without using the separate signal attenuator 22 device. In this example, the controller circuit 16 sends deep-level configuration commands, such as transmit packet-power commands and/or power table commands to the first transceiver 12 to reduce the transmitted power of the first RF signals 14 to the desired power that corresponds to the desired communication range.

The controller circuit 16 detects the presence of the at least one second transceiver 18 within the shorter transmission range (e.g., about 0.4 m to about 2 m) using the first RF signals 14 transmitted at the second transmission level. That is, the first transceiver 12 communicates with the at least one second transceiver 18 within the shorter transmission range enabling the detection by the controller circuit 16. This reduced communication range has the technical advantage of enabling applications such as a "smartphone as a vehicle key", where large communication distances between the smartphone and the vehicle may be problematic for vehicle security. For example, the system 10 may "ignore" potential interfering or malicious BLE signals from distant BLE devices during critical vehicle security modes, such as remote locking and unlocking, and/or remote starting. In an example, the second transceiver 18 is a key fob. In another example, the second transceiver 18 is a tablet. In another example, the second transceiver 18 is a smartwatch. In the example illustrated in FIG. 1, the second transceiver 18 is a smartphone configured to transmit second RF signals 20 in accordance with the BLE specification, and is paired with the system 10 according to the BLE specification as described above.

Referring back to FIG. 1, the first transceiver 12 also receives the second RF signals 20 transmitted from the at least one second transceiver 18. The second RF signals 20 have a first reception level corresponding to a first reception range in accordance with the maximum theoretical BLE range described above (i.e. 600 m). In this example, the controller circuit 16 attenuates the received second RF signals 20 to transfer the second RF signals 20 at a second reception level. The second reception level corresponds to a second reception range that corresponds to a shorter reception range than the first reception range. This shorter reception range limits the communication range of the at least one second transceiver 18 with respect to the first transceiver 12. In this example, the controller circuit 16 attenuates the second RF signals 20 up to about 50 dBm, reducing the communication range between the system 10 and the second transceiver 18 to the range of about 0.4 m to about 2 m, from the initial range of 600 m. It will be appreciated that the controller circuit 16 may attenuate the first RF signals 14 and the second RF signals 20 at the same, or different, levels of attenuation.

Referring back to FIG. 3, the controller circuit 16 attenuates the second RF signals 20 through the separate signal attenuator 22 device that is communicatively coupled to the switched port interface 24. The controller circuit 16 routes the second RF signals 20 from the second transceiver 18 to the first switched port, whereby the second RF signals 20 pass through the signal attenuator 22 interposed between the first switched port and the first transceiver 12, thereby reducing the range of communication of the RF signals. In the example illustrated in FIG. 3, the signal attenuator 22 is bidirectional and attenuates RF signals in both directions (i.e. transmitted and received).

In another example, the controller circuit 16 attenuates the second RF signals 20 by reducing a reception power of the first transceiver 12 without using the separate signal attenuator 22 device. In this example, the controller circuit 16 sends deep-level configuration commands, such as receive automatic gain control (AGC) attenuator selections to the first transceiver 12 to attenuate the second RF signals 20.

In an example, the controller circuit 16 further determines a state of connection between the first transceiver 12 and the at least one second transceiver 18. The state of connection includes a connected state and unconnected state. In the unconnected state, the first transceiver 12 and the at least one second transceiver 18 are able to communicate a limited amount of information without being paired, as described above. For example, in the unconnected state the first RF signals 14 include the advertising packets and the second RF signals 20 include the scan request packets. The controller circuit 16 attenuates the first RF signals 14 and/or the second RF signals 20 when the first transceiver 12 and the at least one second transceiver 18 are in the unconnected state. In an example, once the first transceiver 12 and the at least one second transceiver 18 are in the connected state, the controller circuit 16 ceases to attenuate the first RF signals 14 and the second RF signals 20 to enable the transfer of information at up to the maximum power levels of the system 10.

The controller circuit 16 may use other criteria besides the state of connection to determine whether to attenuate the first RF signals 14 and/or the second RF signals 20. In an example, the controller circuit 16 attenuates the first RF signals 14 and/or the second RF signals 20 when the vehicle doors are locked, and ceases to attenuate the RF signals when the vehicle is unlocked. In another example, the controller circuit 16 attenuates the first RF signals 14 and/or the second RF signals 20 when the vehicle is turned off (e.g., key off), and ceases to attenuate the RF signals when the vehicle is turned on. In another example, the controller circuit 16 attenuates the first RF signals 14 and/or the second RF signals 20 when the TCU has been commanded into a "reduced range" mode via another TCU interface, such as a managed cellular-network signal, and ceases to attenuate the RF signals when the TCU has been commanded into a "normal range" mode. In another example, the controller circuit 16 attenuates the first RF signals 14 and/or the second RF signals 20 when the TCU has counted down a preset timing interval, but does not attenuate the RF signals when the TCU is still counting down the preset timing interval. It will be appreciated that any combination of methods listed above may be implemented for optimal security and user convenience features.

Figure 4:
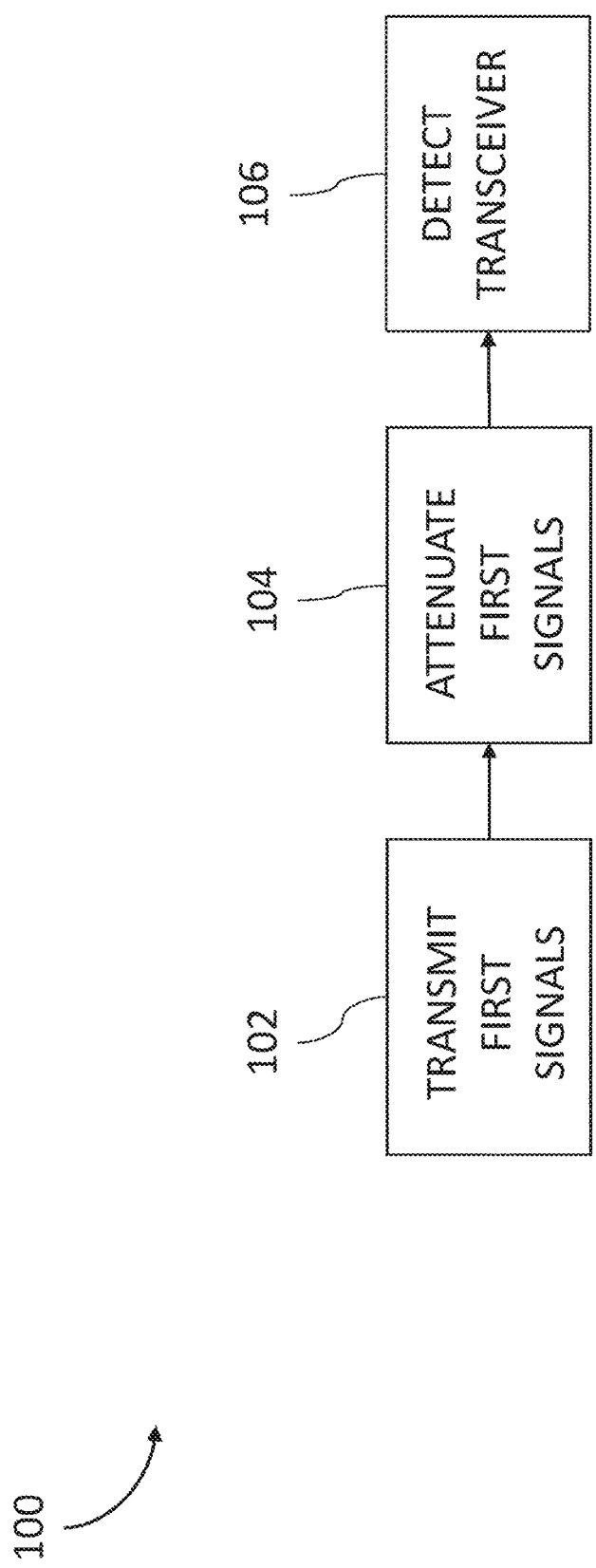
FIG. 4 is a flow chart illustrating a method of reducing a communication range in accordance with another embodiment.

FIG. 4 is a flow chart illustrating an example of a method 100 to reduce a communication distance.

Step 102, TRANSMIT FIRST SIGNALS, includes transmitting the first RF signals 14 with a first transceiver 12 as described above. The first RF signals 14 have the first transmission range that corresponds to the maximum range of transmission of the first transceiver 12 (e.g., greater than 600 m).

Step 104, ATTENUATE FIRST SIGNALS, includes attenuating the first RF signals 14 with the controller circuit 16 communicatively coupled to the first transceiver 12 as described above. The controller circuit 16 reduces the strength of the first RF signals 14 from the first transmission level to the second transmission level, corresponding to the shorter transmission range. In an example, the controller circuit 16 routes the first RF signal through the separate signal attenuator 22. In another example, the controller circuit 16 attenuates the first RF signals 14 without using the separate signal attenuator 22 device by sending deep-level configuration commands such as transmit packet-power commands or power table commands to the first transceiver 12.

Step 106, DETECT TRANSCEIVER, includes detecting, with the controller circuit 16, the at least one second transceiver 18 using the first RF signals 14 transmitted at the second transmission level. The controller circuit 16 detects the presence of the at least one second transceiver 18 within the shorter transmission range as described above.

In an example, the first transceiver 12 receives second RF signals 20 transmitted from the at least one second transceiver 18 as described above. The controller circuit 16 attenuates the second RF signals 20 from the first reception level to the second reception level, corresponding to the shorter reception range than the first reception range. The shorter reception range limits the communication range of the at least one second transceiver 18 with respect to the first transceiver 12.

In an example, the first transceiver 12 and the at least one second transceiver 18 transmit and receive the first RF signals 14 and the second RF signals 20 in accordance with the BLUETOOTH® Core Specification version 4.2 and later, as described above. In this example the first RF signals 14 include advertising packets and the second RF signals 20 include scan request packets. In another example, the controller circuit 16 attenuates the first RF signals 14 and/or the second RF signals 20 when the first transceiver 12 and the second transceiver 18 are in the unconnected state, as described above. In another example, the controller circuit 16 ceases to attenuate the first RF signals 14 and/or the second RF signals 20 when the first transceiver 12 and the second transceiver 18 are in the connected state, as described above.

Accordingly, a system 10 for reducing a communication range, and a method 100 of reducing the communication range are provided. The system 10 is an improvement over other systems because the system 10 ignores RF signals from distant devices that may pose a security threat.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising,"

when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

What is claimed is:

1. A system comprising a controller circuit configured to:
   attenuate first radio frequency (RF) signals transmitted from a first transceiver at a first transmission level associated with a first transmission range to a second transmission level that is lower than the first transmission level and associated with a shorter transmission range than the first transmission range;
   detect, using the attenuated first RF signals, a presence of at least one second transceiver within the shorter transmission range; and
   limit a communication range between the least one second transceiver and the first transceiver by:
      responsive to the first transceiver receiving second RF signals transmitted from the at least one second transceiver at a first reception level corresponding to a first reception range of the first transceiver, attenuate the second RF signals to a second reception level associated with a second reception range that is shorter than the first reception range thereby limiting the communication range between the least one second transceiver and the first transceiver.

2. The system of claim 1, wherein the at least one second transceiver comprises at least one of a smartphone, a tablet, a key fob, or a smartwatch.

3. The system of claim 2, wherein at least one of the first RF signals or the second RF signals comprise signals in accordance with a BLUETOOTH® Core Specification version 4.2 and later.

4. The system of claim 3, wherein the first RF signals include advertising packets.

5. The system of claim 3, wherein the second RF signals include scan request packets.

6. The system of claim 1, wherein the controller circuit is further configured to:
   determine a state of connection between the first transceiver and the at least one second transceiver as being a connected state or an unconnected state; and
   attenuate the first RF signals when the first transceiver and the at least one second transceiver are in the unconnected state.

7. The system of claim 1, wherein the controller circuit is further configured to:
   determine a state of connection between the first transceiver and the at least one second transceiver as being a connected state or an unconnected state; and
   attenuate the second RF signals when the first transceiver and the at least one second transceiver are in the unconnected state.

8. The system of claim 1, wherein the controller circuit is further configured to:
   determine a state of connection between a first transceiver and at least one second transceiver as being a connected state or an unconnected state;
   attenuate the first RF signals when the first transceiver and the at least one second transceiver are in the unconnected state; and
   attenuate the second RF signals when the first transceiver and the at least one second transceiver are in the unconnected state.

9. The system of claim 1, wherein the controller circuit is further configured to attenuate the first RF signals up to 50 dBm to attenuate the first RF signals to the second transmission level associated with the shorter transmission range.

10. The system of claim 9, wherein the controller circuit is further configured to limit the communication range by attenuating the first RF signals to a range between approximately 0.4 m and 2 m.

11. The system of claim 1, wherein the controller circuit attenuates the second RF signals up to 50 dBm.

12. The system of claim 11, wherein the controller circuit reduces the communication range to a range of about 0.4 m to about 2 m.

13. A system comprising a controller circuit configured to:
   determine a state of connection between a first transceiver and at least one second transceiver as being a connected state or an unconnected state;
   when the first transceiver and the at least one second transceiver are in the unconnected state, attenuate first radio frequency (RF) signals transmitted from the first transceiver at a first transmission level associated with a first transmission range to a second transmission level that is lower than the first transmission level and associated with a shorter transmission range than the first transmission range;
   detect, using the attenuated first RF signals, a presence of the at least one second transceiver within the shorter transmission range; and
   when the first transceiver and the at least one second transceiver are in the unconnected state, limit a communication range between the least one second transceiver and the first transceiver by attenuating second RF signals received by the first transceiver from the at least one second transceiver at a first reception level corresponding to a first reception range of the first transceiver to a second reception level associated with a second reception range that is shorter than the first reception range thereby limiting the communication range between the least one second transceiver and the first transceiver.

14. The system of claim 13, wherein the at least one second transceiver comprises at least one of a smartphone, a tablet, or a smartwatch.

15. The system of claim 13, wherein the at least one second transceiver comprises a key fob.

16. The system of claim 13, wherein the controller circuit is part of a keyless entry system of a vehicle.

17. A method, comprising:
   attenuating, by a controller circuit, first radio frequency (RF) signals transmitted from a first transceiver at a first transmission level associated with a first transmission range to a second transmission level that is lower than the first transmission level and associated with a shorter transmission range than the first transmission range; and
   detect, using the attenuated RF signals, a presence of at least one second transceiver within the shorter transmission range; and responsive to the first transceiver receiving second RF signals transmitted from the at least one second transceiver at a first reception level corresponding to a first reception range of the first transceiver, limiting, by the controller circuit, a communication range between the least one second transceiver and the first transceiver by attenuating the second RF signals to a second reception level associated with a second reception range that is shorter than the first reception range.

18. The method of claim 17, further comprising:
    determining a state of connection between the first transceiver and the at least one second transceiver as being a connected state or an unconnected state; and
    attenuating the first RF signals when the first transceiver and the at least one second transceiver are in the unconnected state.

19. The method of claim 18, further comprising:
    attenuating the second RF signals when the first transceiver and the at least one second transceiver are in the unconnected state.

20. The method of claim 17, wherein at least one of the first RF signals or the second RF signals comprise signals in accordance with a BLUETOOTH® Core Specification version 4.2 and later.

* * * * *